Figure 1:
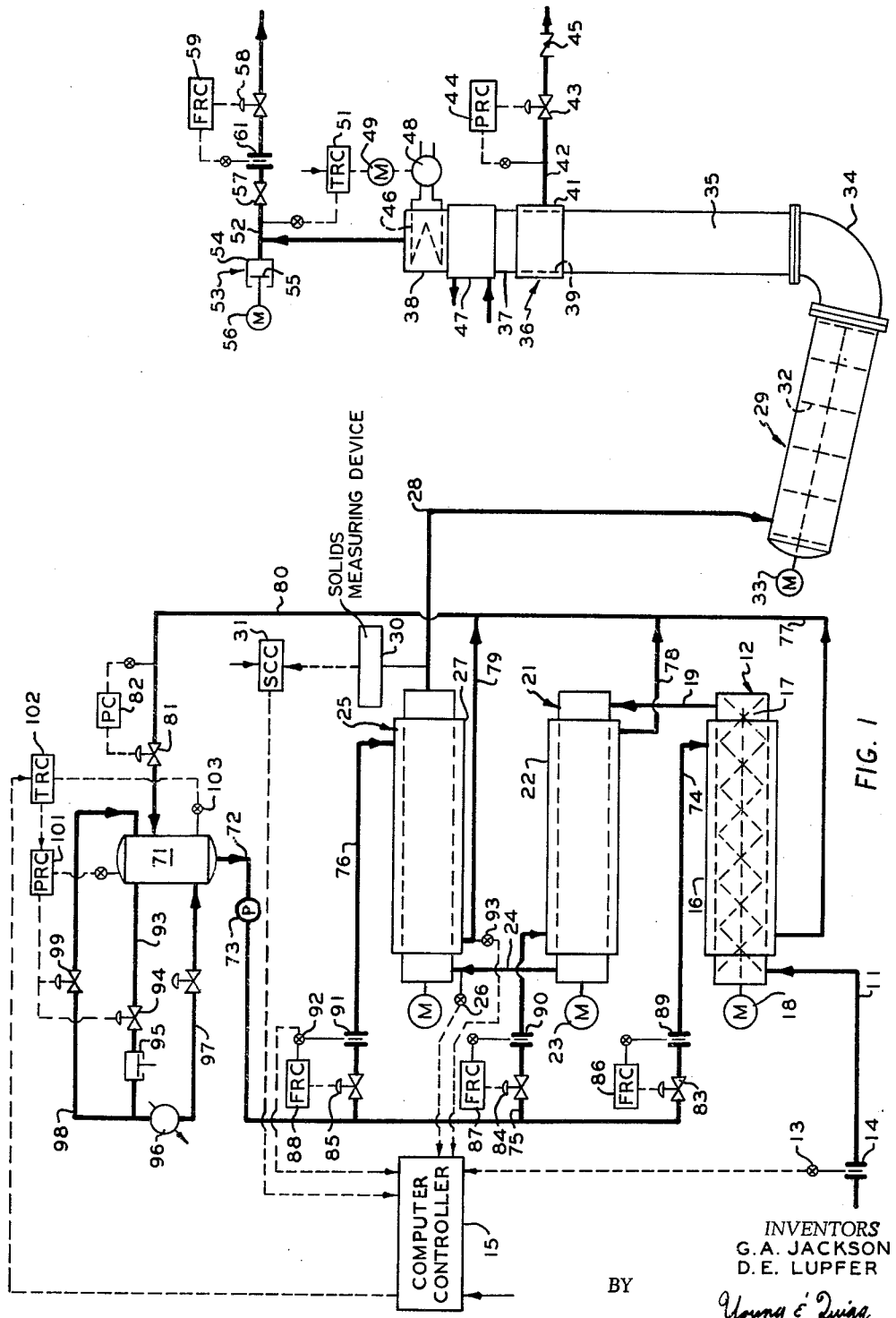

Oct. 19, 1965   G. A. JACKSON ETAL   3,212,283
CRYSTALLIZED SOLIDS CONTENT CONTROL SYSTEM
Filed Nov. 13, 1962   2 Sheets-Sheet 1

INVENTORS
G.A. JACKSON
D.E. LUPFER
BY
*Young & Quigg*
ATTORNEYS

INVENTORS
G.A. JACKSON
D.E. LUPFER

BY

*Young & Quigg*

ATTORNEYS

United States Patent Office 3,212,283
Patented Oct. 19, 1965

3,212,283
CRYSTALLIZED SOLIDS CONTENT
CONTROL SYSTEM
Glenn A. Jackson and Dale E. Lupfer, Bartlesville, Okla., assignors to Phillips Petroleum Company, a corporation of Delaware
Filed Nov. 13, 1962, Ser. No. 236,819
11 Claims. (Cl. 62—58)

This invention relates to method and apparatus for controlling the solids content of a solid-liquid slurry. In one aspect, the invention relates to the separation and purification of components of a multi-component mixture by fractional crystallization. In another aspect, the invention relates to means for controlling the solids content of a slurry supplied to the purification column of fractional crystallization apparatus. In still another aspect, the invention relates to a method for controlling the solids content of a slurry produced by a chiller.

The separation of chemical compounds by means of crystallization finds many applications in industrial installations. While many separations can be made by distillation or solvent extraction, there are cases where these methods are impracticable or impossible, and the desired separation can be effected more advantageously by means of crystallization. Thus, in the case of chemical isomers having similar boiling points and solubilities, or materials having relatively high boiling ranges, or thermally unstable substances, separation by crystallization may be the only method which can be advantageously employed.

As well as offering in many cases perhaps the only practicable method of separation, the crystallization method offers the further advantage of being the only separation method which in the case of eutectic-forming systems theoretically gives a pure product in a single stage of operation. In actual practice, however, the crystals obtained from a solution of several components will be impure because of the occlusion of mother liquor within the crystal interstices. In the conventional fractional crystallization processes, the crystal yield from one batch crystallization is redissolved in a solvent or remelted and again crystallized to effect further purification. The recrystallized product will have less impurities since the concentration of impurity in the new liquor is less than in the previous liquor of crystallization. Such processes require a large amount of equipment and floor space for their operation with resulting high operating expenditures in terms of labor and equipment costs. Furthermore, in these types of processes the purity of the product is limited by the number of stages through which the process is carried.

More recently, a continuous method of separating and purifying multi-component mixtures has been advanced which overcomes the disadvantages of conventional fractional crystallization processes. This method involves cooling a liquid multi-component mixture from which the separation is to be made so as to form crystals of at least one component and thereafter supplying the resulting slurry to a crystal separation and purification column. In this column, crystals are separated from mother liquor and then passed toward a melting zone. The crystals are melted in the melting section and a portion of the melt is withdrawn as product. The remainder of the melt is displaced countercurrently to the movement of the crystals and in intimate contact therewith so as to remove occluded impurities.

When practicing the above-described crystal separation and purification method, it has been found to be desirable to supply to the separation and purification column a slurry which has a substantially constant solids content. When operating in this manner, the production of a high purity product in high yields is greatly facilitated. It also makes possible a steady operating procedure in which fluctuations in product yield and product purity are reduced to a minimum. Furthermore, when practicing the above-described method, it is often desirable to maintain the solids content of the slurry as high as possible while still producing a slurry which is capable of flowing. In order to maintain a high solids content slurry, close control over the refrigeration process whereby the solids are formed is required.

Particularly, control of the crystal (solids) content of the chiller effluent is difficult with many aqueous systems. This is because the freezing-point lowering curves for these systems have a higher slope with the result that the solids content of the system changes appreciably for a 1- or 2-degree change in temperature. Temperature measurement of the chiller effluent is therefore not a sufficiently accurate indication of solids content for control purposes. Should the temperature vary by 2 or 3 degrees, for example, the solids content will vary from about 30 to 40 percent. The latter variation is too great, i.e., the lower solids content is too thin for the crystal purification column and the higher solids content may plug the chiller. More accurate measurement and control of the solids content is needed.

In accordance with a first embodiment of the present invention there is provided a method and apparatus for controlling the solids content of a chiller effluent by varying the temperature of the refrigerant introduced into the chiller responsive to a measurement of the solids content of the chiller effluent.

In accordance with a second embodiment of the present invention there is provided a method and apparatus for controlling the solids content of a chiller effluent by varying the temperature of the refrigerant responsive to a feed-forward computation of the temperature of the refrigerant required to maintain a predetermined desired solids content of the chiller effluent.

In accordance with the presently preferred embodiment of the present invention there is provided a method and apparatus for controlling the solids content of a chiller effluent by varying the temperature of the refrigerant responsive to a feed-forward computation of the temperature of the refrigerant required to maintain a predetermined desired solids content of the chiller effluent as corrected by a feedback signal representative of a measurement of the actual solids content of the chiller effluent.

Accordingly, it is an object of this invention to provide an improved refrigeration system. Another object of the invention is to provide improved fractional crystallization apparatus and method. Still another object of the invention is to provide an improved method and apparatus for the separation of multi-component mixtures. Yet another object of the invention is to provide fractional crystallization apparatus comprising an improved crystal forming means having associated therewith means for controlling the solids content of the crystal slurry. A still further object of this invention is to provide a method for controlling the refrigeration requirements of a chiller so as to obtain a slurry having a desired solids content. Another object of the invention is to provide a method and means for controlling the temperature of a refrigerant to a heat exchanger responsive to changes in enthalpy of the cooled fluid.

Other objects, aspects and advantages of the invention will be apparent from a study of the disclosure, the drawing and the appended claims to the invention.

Figure 2:
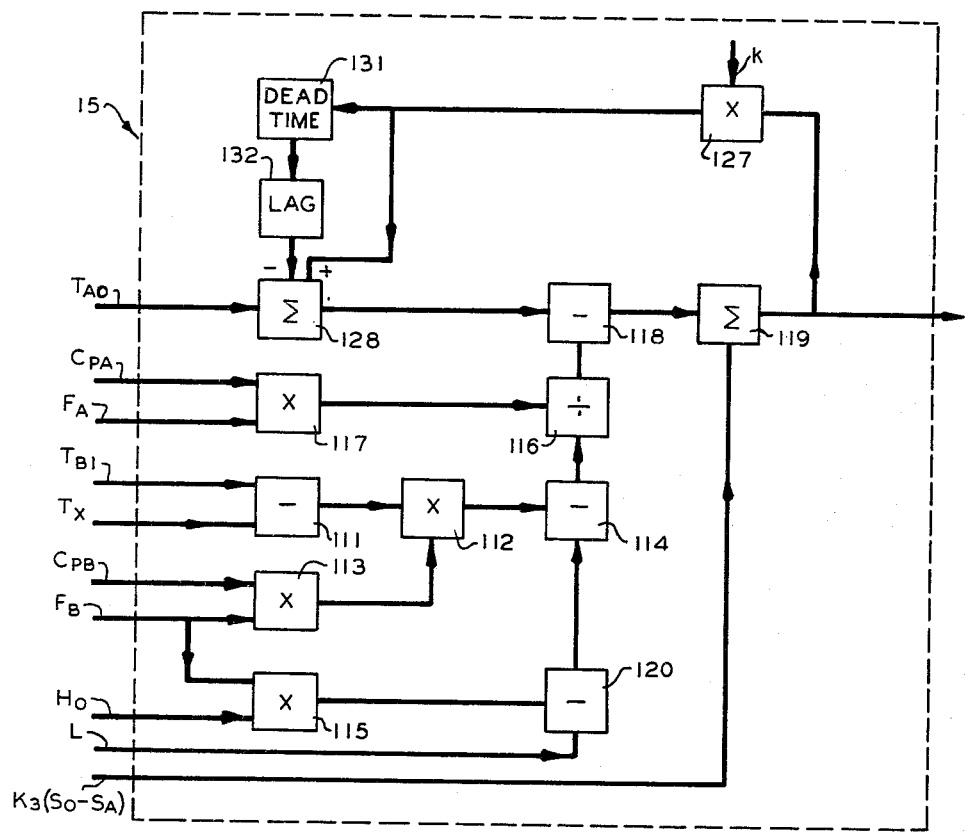
Figure 3:
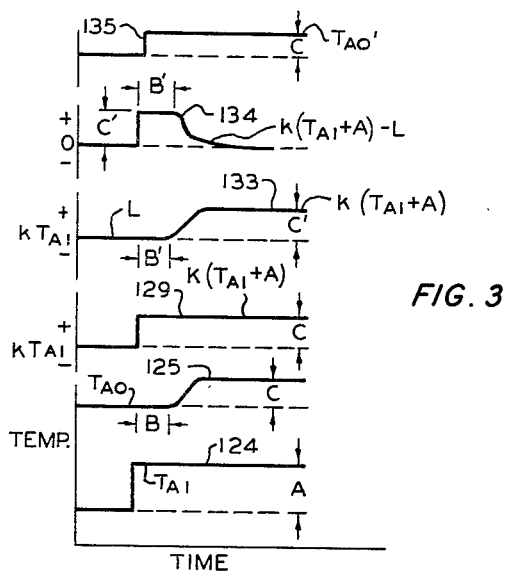

In the drawings, FIGURE 1 is a diagrammatic representation of a crystal purification system embodying the present invention, FIGURE 2 is a diagrammatic representation of the computer of FIGURE 1, and FIGURE 3 is a graphic representation of certain of the functions generated in the computer of FIGURE 1.

Broadly speaking, the present invention is directed to the separation and purification of components of multicomponent mixtures and involves controlling the operation of the chillers or crystallizers so as to provide a slurry having a desired constant solids content. The control method of this invention is based upon the discovery that the solids content of the chiller effluent could be measured by making an enthalpy balance around the chiller. The change in enthalpy of the refrigerant is measured and equated to the change in enthalpy of the fluid being cooled and partially frozen. The equation is as follows:

(1) $F_A C_{pA}(T_{AO} T_X) - F_A C_{pA}(T_{AI} - T_X) = F_B C_{pB}(T_{BI} - T_X) - F_B H_O + L$ where $F_A$ = rate of flow of liquid refrigerant in chiller, lb./hr.
$C_{pA}$ = specific heat of liquid refrigerant, B.t.u./lb. per ° F.
$T_{AO}$ = temperature of refrigerant at outlet of chiller, ° F.
$T_{AI}$ = temperature of refrigerant at inlet of chiller, ° F.
$T_X$ = reference temperature, ° F.
$F_B$ = rate of flow of liquid being cooled, lb./hr.
$C_{pB}$ = specific heat of liquid being cooled, B.t.u./lb. per ° F.
$T_{BI}$ = temperature at inlet of chiller of liquid being cooled, ° F.
$H_O$ = desired enthalpy with respect to $T_X$ of partially frozen liquid at outlet of chiller, B.t.u./lb.
$L$ = losses, B.t.u./hr.

The reference temperature $T_X$ can be the freezing point of the fluid being cooled, if desired.

If several chillers are used in series, it is only necessary to take the enthalpy balance around the chillers in which the phase change from liquid to partially frozen liquid occurs. Rearranging Equation 1 and solving for $T_{AI}$ gives:

(2) $$T_{AI} = \frac{F_A C_{pA} T_{AO} - F_B C_{pB}(T_{BI} - T_X) + F_B H_O - L}{F_A C_{pA}}$$

This can be rewritten as:

(3) $T_{AI} = T_{AO} - F_B K_1(T_{BI} - T_X) + K_2 F_B H_O - K_2 L)$ where $$K_1 = \frac{C_{pB}}{F_A C_{pA}}$$

and $$K_2 = \frac{1}{F_A C_{pA}}$$

The actual enthalpy or the percentage solids content of the partially frozen liquid mixture leaving the chiller can be determined and utilized as a feedback signal to correct the value of $T_{AI}$ for variations of factors such as heat leak, inaccuracies in flow and temperature measurements, which Equation 3 does not take into consideration. As the accuracy of the feed forward or predictive control is directly dependent upon the accuracy of the mathematical model and the measurements and it is often impossible or undesirable to account for all of the variables and their exact interrelationship, a feedback signal representative of the actual value of the controlled variable is utilized in the preferred embodiment of the present invention to continuously or intermittently correct the predictive signal for variations in the controlled variable which result from the inaccuracy of the mathematical model or from any other extraneous source. For such a system Equation 3 can be rewritten as:

(4) $T_{AIC} = T_{AO} - F_B K_1(T_{BI} - T_X) + K_2 F_B H_O - K_2 L + K_3(S_O - S_A)$ where $S_A$ = actual percentage solids in the partially frozen liquid,
$S_O$ = desired percentage solids in the partially frozen liquid,
$K_3 = f$ (controller 31), ° F./percent solids, and
$T_{AIC}$ = corrected value of the required temperature of chiller, ° F.

The above equations are for the case where the liquid refrigerant does not boil in the chiller jacket, i.e., only sensible heat of the liquid refrigeration is used to remove heat from the fluid being chilled.

Referring now to the drawing and to FIGURE 1 in particular, a liquid mixture to be concentrated is passed through conduit 11 into the inlet of scraped surface chiller 12. Flow transmitter 13 is connected across flow meter 14 located in line 11 and transmits a signal representative of $F_B$ to solids computer controller 15. Chiller 12 is provided with a jacket 16 through which a suitable refrigerant, for example ammonia, is circulated. The scraper 17 within chiller 12 is rotated by motor 18. The cooled liquid mixture is withdrawn from chiller 12 and passed by way of conduit 19 into the inlet of chiller 21 wherein the liquid mixture is further cooled. Chiller 21 is provided with a jacket 22 through which a suitable refrigerant is circulated, and a scraper (not shown) which is rotated by motor 23. The thus further cooled liquid mixture is withdrawn from chiller 21 and passed by way of conduit 24 into the inlet of chiller 25, wherein at least a portion of one of the components of the liquid mixture is frozen to form a slurry of crystals in mother liquor. Temperature transducer 26 measures the temperature of the liquid in conduit 24 and transmits a signal representative of $T_{BI}$ to computer-controller 15. Chiller 25 is provided with a jacket 27 through which a suitable refrigerant is passed. The slurry of crystals in mother liquor is withdrawn from chiller 25 and passed by way of conduit 28 into the inlet of crystal growing tank 29. A suitable solids content measuring device 30 measures the solids content of the slurry in line 28, and transmits an output signal to solids content controller 31 which converts the measured percentage solids content of the slurry into a signal which is representative of the term $K_3(S_O - S_A)$ which is then transmitted to computer-controller 15. Measuring device 30 can be a temperature measuring device for those partially frozen mixtures whose temperature is a good indication of percentage solids content. However, for many mixtures, particularly aqueous mixtures, temperature is not a good indication of percentage solids content. In the latter case it is preferred to use a device to measure percentage solids content directly, for example a dielectric gauge, a calorimeter, or a radiation gauge manufactured by the Ohmart Corporation of Cincinnati, Ohio.

Tank 29 is provided with an agitator 32 which is driven by motor 33. The residence time in tank 29 is generally on the order of 1 to 10 hours. From the standpoint of crystal growth, even longer times are desirable; however, it generally is not economical to provide sufficiently large tanks to permit longer growth time. The outlet of tank 29 is in direct communication with vertically positioned elbow-shaped conduit 34 which is in direct communication with the inlet of purification column 35. Column 35 comprises filtration section 36, reflux section 37, and melting section 38. Filtration section 36 comprises a suitable filter screen or medium 39 and an external shell 41, the latter being provided with an outlet pipe 42 through which the filtrate, that is, the mother liquor, is passed. Filter medium 39 can be of any desired type known in the art. For example filter medium 39 can comprise a metallic screen, a sintered perforate metal member, or a perforate member supporting a filter cloth. It is desirable that filter medium 39 be positioned integrally with respect to the adjacent walls of column 35 to maintain minimum resistance to the flow of crystals to melting section 38. Although filtration section 36 has been illustrated in the drawing as being an external filter, it is within the scope of the invention to utilize an internal filter, in which event external shell 41 could be positioned integrally with respect to the walls of column 35 and filter medium 39 would be disposed within shell 41 and preferably positioned coaxially with respect to column 35. The filtrate produced in filtration section 36 is removed from purification column 35 by way of conduit 42. Conduit 42 can contain a suitable means for maintaining a predetermined back pressure, such as valve 43 which is regulated by pressure recorder controller 44 responsive to the pressure in conduit 42. A check valve 45 can be provided in conduit 42 to prevent the back flow of withdrawn filtrate.

The crystal mass is passed into reflux section 37 wherein it is countercurrently contacted with liquid reflux as subsequently described. As the crystal mass approaches heating element 46 in melting section 38, the crystals are melted. If desired, an external heating element 47 can be utilized instead of or in addition to internal heating element 46. Heating elements 46 and 47 can be any suitable devices known in the art, for example indirect fluid heat exchangers or electrical heating elements. The rate of introduction of heat into melting section 38 can be controlled by maintaining the heat exchange rate for heating element 47 substantially constant while varying the heat exchange rate for heating element 46 responsive to the temperature of the melt. For example where internal heating element 46 is an electrical heater, its heat exchange rate can be varied by means of powerstat 48 which is rotated by a motor 49 which in turn is controlled by temperature recorder controller 51 responsive to the temperature of the melt in melt withdrawal conduit 52. A portion of the melt produced by the heat introduced into melting section 38 is withdrawn through melt withdrawal conduit 52 as a purified product of the process while the remainder of the melt is forced back into reflux section 37 as reflux for effecting crystal purification.

Column 35 is provided with a pulsation-producing means 53 which comprises a cylinder 54 having one end in fluid communication with column 35, and reciprocable piston 55 mounted within cylinder 54. Reciprocation of piston 53 is produced by any suitable means, for example by an electrical motor 56 having suitable cams associated therewith. While the crystal mass is being advanced from tank 29 through filtration section 36 and reflux section 37 into melting section 38, piston 55 is reciprocated at a suitable rate, such as in the range of about 50 to about 400 pulsations per minute, so that a pulsating pressure is exerted on the melt reflux which is intermittently forced back, counter currently with respect to the movement of the crystal mass through reflux section 37. A check valve 57 can be provided in melt withdrawal conduit 52 to prevent the back flow of withdrawn melt. If desired, check valve 57 can be replaced or augmented by a suitable valve, such as a solenoid valve, which is cyclically opened and closed in synchronism with the movement of piston 55. The rate of withdrawal of melt through conduit 52 can be maintained at a substantially constant rate by means of valve 58 which is actuated by flow rate recorder controller 59 responsive to the pressure drop across an orifice 61 located in conduit 52.

Liquid refrigerant for chillers 12, 21 and 25 is withdrawn from refrigeration knock-out pot 71 by way of conduit 72 and pump 73 and passed through conduits 74, 75 and 76 into the inlets of refrigerant jackets 16, 22 and 27, respectively. The warmed refrigerant is withdrawn from jackets 16, 22 and 27 by way of conduits 77, 78 and 79, respectively, and passed by way of conduit 80 and valve 81 into knock-out pot 71. Valve 81 is actuated by pressure controller 82 responsive to the pressure in conduit 80 upstream of valve 81 to maintain such pressure substantially constant with the pressure being sufficiently high to maintain the refrigerant in the chiller in a liquid state. The rates of flow of liquid refrigerant through conduits 74, 75 and 76 are controlled by valves 83, 84 and 85, respectively, which in turn are actuated by flow rate recorder controllers 86, 87 and 88 responsive to the differential pressure across flow meters 89, 90 and 91, respectively. A signal representative of $F_A$ is also transmitted by differential pressure transducer 92 to computer-controller 15 responsive to the differential pressure across orifice 91. Temperature transducer 93 is connected to conduit 19 and transmits a signal representative of $T_{AO}$ to computer-controller 15.

Refrigerant vapor is withdrawn from knock-out pot 71 and passed by way of conduit 93 and valve 94 into compressor 95. A portion of the compressed vapor is passed through condenser 96 and conduit 97 into knock-out pot 71. The remainder of the compressed vapor is passed through bypass conduit 98 and valve 99 into knock-out pot 71. Valves 94 and 99 are opposite acting valves and are actuated by pressure recorder controller 101 responsive to a comparison of the pressure in knock-out pot 71 and a set point signal. Thus for an increase in the pressure in knock-out pot 71 above the set point signal, valve 94 will be further opened while valve 99 is further closed. The utilization of valve 99 avoids loading and unloading of compressor 95, thus eliminating the resulting pressure surges. The utilization of both valves 94 and 99 in an opposite acting manner greatly increases the response of the control system for regulating the pressure in knock-out pot 71.

Computer controller 15 produces an output signal representative of $T_{AIC}$ which is applied to the set point input of temperature recorder controller 102. Temperature transducer 103 transmits to temperature recoder contoller 102 a signal representative of the actual temperature of the liquid refrigerant in knock-out pivot 71. Temperature controller 102 compares the signal representative of $T_{AIC}$ with the signal representative of the actual temperature of the liquid refrigerant and produces an output signal responsive to the comparison which is then applied to the set point input of pressure recorder controller 101.

Referring now to FIGURE 2 a set point signal representative of $T_X$ is applied to the subtrahend input of subtractor 111 while a signal representative of $T_{BI}$ from temperature transducer 26 is applied to the minuend input of subtractor 111 to obtain an output signal representative of $(T_{BI}-T_X)$ which is applied to one input of multiplier 112. A set point signal representative of $C_{pB}$ is applied to one input of multiplier 113 while a signal representative of $F_B$ from flow transmitter 13 is applied to a second input of multiplier 113. The resulting product is applied to one input of multiplier 112 to obtain the product $F_B C_{pB} (T_{BI}-T_X)$, which is applied to the minuend input of subtractor 114. A set point signal representative of $H_O$ and a signal representative of $F_B$ are applied to first and second inputs of multiplier 115, the output of which is applied to the minuend input of subtractor 120. A signal representative of L is applied to the subtrahend input of subtractor 120 to obtain a signal representative of $+F_B H_O - L$ which is applied to the subtrahend input of subtractor 115 to obtain a signal representative of $+F_B C_{pB} (T_{BI}-T_X)-F_B H_O+L$, which is applied to the dividend input of divider 116. A set point signal representative of $C_{pA}$ and a signal representative of $F_A$ from differential pressure transmitter 92 are applied to first and second inputs of multiplier 117, the output of which is applied to the divisor input of divider 116 to obtain a signal representative of $$\frac{+F_B C_{pB}(T_{BI}-T_X)-F_B H_O+L}{F_A C_{pA}}$$

which is applied to the subtrahend input of subtractor 118. A signal representative of $T_{AO}$ from temperature transducer 93 can be applied to the minuend input of subtractor 118 to produce a signal representative of $T_{AI}$ which is applied to one input of algebraic summer 119. A signal from controller 31 representative of $K_3(S_O-S_A)$ is applied to a second input of algebraic summer 119, either continuously or intermittently. The output of summer 119 is representative of $T_{AIC}$ and is transmitted to the set point of temperature recorder controller 102.

It has been found that when a change is made in $T_{AIC}$, $T_{AO}$ will exhibit a change in the same direction. Thus as shown in FIGURE 3, for a step increase in $T_{AI}$ of a value A as represented by curve 124, $T_{AO}$ will begin to increase after a dead time of B and will continue to increase as a lag function of the step increase A in $T_{AI}$ until $T_{AO}$, as represented by curve 125, has increased by an amount C, which can be defined as a fraction of A. This results in the final differential temperature of the refrigerant through the chiller, or $T_{AO}-T_{AI}$, being less than the desired value necessary to obtain the desired percent solids content. Where this drop in differential temperature is of significance, it can be overcome by applying the output of summer 119 to an input of multiplier 127 wherein it is multiplied by a signal representative of $k$ where $k=C/A$. The output of multiplier 127 is applied to one input of algebraic summer 128 and is represented by curve 129 in FIGURE 3. The output of multiplier 127 is also applied to the input of dead time delay means 131 wherein the signal is delayed for an interval B'. The delayed signal is applied to the input of lag function generating device 132 wherein a first, second, or third order lag is introduced into the delayed signal to approximate the actual lag exhibited by $T_{AO}$. The output of device 132 can be designated L and is illustrated by curve 133 in FIGURE 3 for a step change of A in $T_{AI}$. The values B' and C' are approximations of the values B and C. Under steady state conditions the input to summer 128 from multiplier 127 is $+KT_{AI}$ while the input to summer 128 from device 132 is $-KT_{AI}$, thus cancelling each other, resulting in summer 128 having an output $T_{AO}$. For a step change in $T_{AI}$ of A, the input to summer 128 from multiplier 127 becomes $+K(T_{AI}+A)$ while the input to summer 128 from device 132 is still $-kT_{AI}$, thus resulting in an output from summer 128 of $T_{AO}+kA$. The algebraic summation in summer 128 of the signal representative of $K(T_{AI}+A)$ and the negative of the signal representative of L is illustrated by curve 134 of FIGURE 3. The output of summer 128 can be defined at $T_{AO}'$ and if the approximation of the values $k$ and B' and the lag curve of $T_{AO}$ are sufficiently accurate, the output of summer 128 will be a step change as represented by curve 135 in FIGURE 3. The utilization of $T_{AO}'$ "fools" the remainder of the computer-controller into immediately requiring a higher (or lower, if A is a negative change) value of $T_{AI}$. This higher value of $T_{AI}$ provides the desired differential temperature of the refrigerant through the chiller by accounting for the subsequent resulting increase in $T_{AO}$. The utilization of $T_{AO}'$ also gives faster response and a more accurate and uniform control.

The following specific example is presented in further illustration of the invention, but is not to be construed to unduly limit the invention.

A feed stream of beer to be concentrated is applied through conduit 11 to chiller 12 at the rate of 892 pounds per hour. The beer is cooled in chillers 12 and 21 and passed into chiller 25 at a temperature of 30° F. wherein it is cooled to 26.5° F. and a portion of the water is frozen by indirect heat exchange with liquid ammonia which is passed through conduit 76 at a rate of 7,100 lb./hr. and a temperature of approximately 15° F. and leaves jacket 27 by way of conduit 79 at a temperature of approximately 22° F. The slurry which is withdrawn from chiller 25 by way of conduit 28 comprises approximately 37 weight percent ice crystals. The slurry is passed into tank 29 wherein the ice crystals are permitted to grow for approximately 3 hours, and is finally introduced into purification column 35. Signals representative of $F_B$, $T_{BI}$, $F_A$, $T_{AO}$, and $K_3(S_O-S_A)$ are generated and transmitted to computer-controller 15. A material balance of the system is set forth in the following table:

| Conduit | Feed 11 | Cooled Feed 24 | Chiller Effluent 28 | Mother Liquor 42 | Water Product 52 |
|---|---|---|---|---|---|
| Component: | | | | | |
| Ethyl Alcohol | 34 | 34 | 34 | 34 | trace |
| Soluble Solids | 45 | 45 | 45 | 45 | trace |
| Water (liquid) | 813 | 813 | 483 | 483 | 330 |
| Water (ice) | 0 | 0 | 330 | 0 | 0 |
| Total (lb./hr.) | 892 | 892 | 892 | 562 | 330 |
| Weight percent ice | 0 | 0 | 37 | 0 | 0 |
| Weight percent alcohol | 3.96 | 3.96 | 3.96 | 6.05 | 0.05 |
| Temperature, °F | 80 | 30 | 26.5 | 26.5 | 40 |

Upon the occurrence of a change in the flow rate of the feed in conduit 11 from 892 lb./hr. to 950 lb./hr., computer-controller 15 changes the set point signal to temperature recorder controller 102 from 15° F. to 14.6° F., utilizing the circuit of FIGURE 2 for compensating for the resulting decrease in $T_{AO}$. Temperature controller 102 varies the set point signal to pressure controller 101, which in turn further opens valve 94 and further closes valve 99 until a pressure of 42.8 p.s.i.a. in pot 71 is obtained thus changing the temperature of the liquid refrigerant in pot 71 to 14.6° F.

Upon a subsequent increase in losses of from 3600 to 4900 B.t.u./hr. to the atmosphere from jacket 27, the actual percentage solids content of the slurry in conduit 28 drops from 37 weight percent to 36 weight percent. Solids content controller 31 applies a feedback correction signal to computer controller 15 which alters the set point signal to controller 102 from 14.6° F. to 14.4° F., utilizing the compensating circuit. Temperature controller 102 varies the set point signal to pressure controller 101 which in turn further opens valve 94 and further closes valve 99 until a pressure of 42.6 p.s.i.a. is obtained, thus changing the temperature of the liquid refrigerant in pot 71 to 14.4° F.

From the above it can be seen that the operation of the system serves to maintain the solids content at approximately 37 wt. percent.

Although this invention has been described in conjunction with the concentration of beer as a specific example, it should be evident that it is not limited thereto. The invention can be employed to advantage to concentrate a variety of food products and beverages. Examples of these include milk, fruit juices, vegetable juices, vinegar, coffee, tea, wine, liquors and the like. In addition, the invention can be employed to separate various mixtures of organic materials. Numerous examples of mixtures of organic materials which can be separated by the present invention are described in the Thomas Patent 2,856,494. This invention is particularly useful when the components of the feed which is to be frozen comprise approximately 70 weight percent or more of the feed mixture. In separations of this type, it is important to increase the concentration in the feed of the component which is not frozen in order to permit more efficient operation. A multi-stage apparatus can also be utilized to provide this concentration. In this regard, it should be evident that more or fewer than three stages can be employed, depending upon the composition of the feed and the degree of separation desired.

The concentration of the non-freezing component of the feed to the chiller can be increased still further by recycling additional portions of the mother liquor. The amount of mother liquor recycled depends to a large extent upon the number of stages of separation employed and the degree of concentration required. It should be evident that the concentration of the final product is increased by recycling more mother liquor.

An analog computer of either the electronic or pneumatic type may be used. An electronic computer such as the Model PC-12 by Electronic Associates, Inc., can be employed. In addition, the computer may also be custom built from components supplied by Electronic Associates, Inc.

Reasonable variations and modifications are possible within the scope of the foregoing disclosure, the drawing and the appended claims to the invention.

We claim:

1. In a process for obtaining a partially frozen slurry from a liquid by passing said liquid in indirect heat exchanging relationship with a refrigerant and wherein it is desired to maintain the percentage of the frozen solids in the slurry substantially constant, the improvement comprising, establishing a first signal representative of the enthalpy of said liquid before the liquid is passed into said heat exchanging relationship, establishing a second signal representative of the enthalpy which said partially frozen slurry must have for the desired percentage solids content, establishing a third signal responsive to said first and second signals representative of the change in temperature of said refrigerant in being passed through said heat exchanging relationship which is required to effect the desired change in enthalpy of said liquid, and regulating the temperature of said refrigerant as it is passed into said heat exchanging relationship responsive to said third signal.

2. In a process which comprises introducing into a cooling zone a liquid multi-component mixture containing one component whcih crystallizes first upon cooling of said mixture, passing a refrigerant through said cooling zone in indirect heat exchanging relationship with said mixture thereby forming a slurry of crystals of said component in mother liquor, passing said slurry through a filtering zone from which a stream of mother liquor is withdrawn, passing the crystals and any remaining mother liquor from said filtering zone through a reflux zone and into a melting zone, introducing heat into said melting zone to melt the crystals to obtain a melt, withdrawing a portion of the melt from the melting zone as a product stream, passing the remainder of the melt countercurrently to the movement of crystals through said reflux zone as reflux therefor; the improvement comprising establishing a first signal representative of the rate of flow of said mixture through said cooling zone, establishing a second signal representative of the difference between a reference temperature and the temperature of said mixture as it is introduced into said cooling zone; establishing a third signal representative of the specific heat of said mixture; establishing a fourth signal representative of the product of said first, second and third signals; establishing a fifth signal representative of the enthalpy with respect to said reference temperature which said slurry would have for a predetermined desired percentage of said crystals in said slurry; establishing a sixth signal representative of the product of said first signal and said fifth signal, establishing a seventh signal representative of the difference between said fourth signal and said sixth signal, establishing an eighth signal representative of the rate of flow of said refrigerant through said cooling zone; establishing a ninth signal representative of the specific heat of said refrigerant; establishing a tenth signal representative of the product of said eighth signal and said ninth signal; establishing an eleventh signal representative of the division of said seventh signal by said tenth signal; establishing a twelfth signal representative of the temperature of said refrigerant as said refrigerant leaves said cooling zone; establishing a thirteenth signal representative of the difference betwen said eleventh and twelfth signals, and controlling the temperature of said refrigerant as it enters said cooling zone responsive to said thirteenth signal.

3. A process in accordance with claim 2 further comprising establishing a fourteenth signal representative of the actual percentage solids content of said slurry, and compensating said thirteenth signal for variations of said fourteenth signal from said fifth signal.

4. A process in accordance with claim 2 wherein said refrigerant is withdrawn from said cooling zone and passed into a refrigerant zone, refrigerant vapor is withdrawn from said refrigerant zone and compressed, a first portion of the thus compressed refrigerant vapor is condensed, the resulting condensed refrigerant vapor is returned to said refrigerant zone, a second portion of the compressed refrigerant vapor is returned directly to said refrigerant zone; and wherein the temperature of said refrigerant is controlled by regulating the rate of withdrawal of refrigerant vapor from said refrigerant zone and the rate of return of compressed refrigerant vapor into said refrigerant zone in an opposite manner responsive to a comparison of the pressure in said refrigerant zone and the pressure in said refrigerant zone which would be required to obtain the desired value of temperature of said refrigerant.

5. In a process which comprises introducing into a cooling zone a liquid multi-component mixture containing one component which crystallizes first upon cooling of said mixture, passing a cooling medium through said cooling zone in indirect heat exchanging relationship with said mixture thereby forming a slurry of crystals of said component in mother liquor; passing said slurry through a filtering zone from which a stream of mother liquor is withdrawn, passing the crystals and any remaining mother liquor from said filtering zone through a reflux zone and into a melting zone, introducing heat into said melting zone to melt the crystals to obtain a melt, withdrawing a portion of the melt from the melting zone as a product stream, passing the remainder of the melt countercurrently to the movement of crystals through said reflux zone as reflux therefor; the improvement comprising maintaining the percentage of crystals in said slurry substantially constant at a predetermined value by controlling the temperature of the cooling medium which is introduced into said cooling zone to substantially maintain the following relationship:

$$T_{AI} = T_{AO} - \left( \frac{F_B C_{pB}(T_{BI} - T_X) - F_B H_O + L}{F_A C_{pA}} \right)$$

wherein $T_{AI}$=the temperature of said cooling medium at the cooling medium inlet of said coling zone, $T_{AO}$=the temperature of said cooling medium at the cooling medium outlet of said cooling zone, $F_B$=the rate of flow of said mixture, $C_{pB}$=the specific heat of said mixture, $T_{BI}$=the temperature of said mixture at the mixture inlet of said cooling zone, $T_X$=a reference temperature, $H_O$=the enthalpy with respect to $T_X$ of said slurry having said predetermined value of percentage of crystals in said slurry, $F_A$=the rate of flow of said cooling medium, $C_{pA}$=the specific heat of said cooling medium, and $L$=losses.

6. A process in accordance with claim 5 wherein said relationship is compensated for variations in $T_{AO}$ due to a change in $T_{AI}$.

7. Apparatus for obtaining a partially frozen slurry having a predetermined percentage of frozen solids from a liquid, comprising a heat exchanger, means for passing said liquid through said heat exchanger, means for passing a refrigerant through said heat exchanger in indirect heat exchanging relationship with said liquid, means for establishing a first signal representative of the enthalpy of the liquid before said liquid is passed into said heat exchanger, means for establishing a second signal representative of the enthalpy which said partially frozen slurry would have for said predetermined percentage of frozen solids, means for establishing a third signal responsive to said first and second signals representative of the change in temperature of said refrigerant in being passed through said heat exchanger which is required to effect the desired change in enthalpy of said liquid, and means for regulating the temperature of said refrigerant as the refrigerant is passed into said heat exchanger responsive to said third signal to maintain said percentage of frozen solids in said slurry substantially constant.

8. Apparatus in accordance with claim 7 further comprising means for compensating said third signal for variations of the actual percentage of frozen solids from said predetermined percentage of frozen solids.

9. In an apparatus comprising a heat exchanger, means for introducing into said heat exchanger a liquid multicomponent mixture containing one component which crystallizes first upon cooling of said mixture; means for passing a refrigerant through said heat exchanger in indirect heat exchanging relationship with said mixture thereby forming a slurry of crystals of said component in mother liquor; a purification column comprising a filtering section, a reflux section, and a melting section; means for passing said slurry through said filtering section; means for withdrawing a stream of mother liquor from said filtering section; means for passing the crystals and any remaining mother liquor from said filtering section through said reflux section and into said melting section; means for introducing heat into said melting section to melt the crystals to obtain a melt; means for withdrawing a portion of the melt from the melting section as a product stream; means for passing the remainder of the melt countercurrently to the movement of crystals through said reflux section as reflux therefor; the improvement comprising means for controlling the temperature of the refrigerant which is introduced into said heat exchanger to substantially maintain the following relationship:

$$T_{AI} = T_{AO} - \left( \frac{F_B C_{pB}(T_{BI} - T_X) - F_B H_O + L}{F_A C_{pA}} \right)$$

wherein $T_{AI}$=the temperature of said refrigerant at the refrigerant inlet of said heat exchanger, $T_{AO}$=the temperature of said refrigerant at the refrigerant outlet of said heat exchanger, $F_B$=the rate of flow of said mixture, $C_{pB}$=the specific heat of said mixture, $T_{BI}$=the temperature of said mixture at the mixture inlet of said heat exchanger, $T_X$=a reference temperature, $H_O$= the enthalpy with respect to $T_X$ of said slurry, $F_A$=the rate of flow of said refrigerant, $C_{pA}$=the specific heat of said refrigerant, said $L$=losses.

10. Apparatus in accordance with claim 9 further comprising means for overriding said means for maintaining responsive to variations of the actual percentage of crystals in said slurry from said predetermined value of percentage of crystals in said slurry.

11. Apparatus in accordance with claim 9 wherein said means for maintaining comprises a refrigerant knock-out chamber, means for withdrawing liquid refrigerant from said chamber and passing the thus withdrawn liquid refrigerant through said heat exchanger at a substantially constant rate, means for returning refrigerant from said refrigerant outlet into said chamber, means for withdrawing refrigerant vapor from said chamber, means for condensing a first portion of the thus compressed refrigerant vapor, means for returning the resulting condensed refrigerant vapor into said chamber, means for introducing a second portion of said compressed refrigerant vapor into said chamber, and means for controlling the rate of withdrawal of refrigerant vapor from said chamber and the rate of introduction of said second portion into said chamber in an opposite manner responsive to the pressure in said chamber to maintain said pressure at the value corresponding to the desired temperature of the liquid refrigerant.

References Cited by the Examiner

UNITED STATES PATENTS 3,093,649    6/63    Ratje _____ 62—58

NORMAN YUDKOFF, *Primary Examiner.*